United States Patent [19]

Cuschera

[11] Patent Number: 4,712,758
[45] Date of Patent: Dec. 15, 1987

[54] NESTED HUB KNOCK-DOWN PEDESTAL

[76] Inventor: Casper Cuschera, 967 Industrial Parkway West, Hayward, Calif. 94544

[21] Appl. No.: 822,323

[22] Filed: Jan. 27, 1986

[51] Int. Cl.[4] .......................................... A47B 91/00
[52] U.S. Cl. ................................................ 248/188.7
[58] Field of Search .............. 248/677, 511, 519, 523, 248/529, 150, 164, 165, 158, 431, 440.1, 188.1, 188.7, 188.8

[56] References Cited

U.S. PATENT DOCUMENTS

| Re. 26,061 | 7/1966 | Buhrmaster | 248/188.7 |
|---|---|---|---|
| 1,762,545 | 6/1930 | Carpenter | 248/165 |
| 2,918,243 | 12/1959 | Johnson | 248/188.7 |
| 3,062,494 | 11/1962 | French | 248/188.7 |
| 3,286,964 | 11/1966 | McMahan | 248/188.7 |
| 4,363,460 | 12/1982 | Carroll | 248/188.7 |
| 4,406,437 | 9/1983 | Wright | 248/188.7 |

FOREIGN PATENT DOCUMENTS 97907 2/1964 Denmark .......................... 248/188.1

Primary Examiner—J. Franklin Foss
Assistant Examiner—Robert A. Olson
Attorney, Agent, or Firm—Harris Zimmerman; Howard Cohen

[57] ABSTRACT

A pedestal of the type having arms which extend from a central load supporting hub to caster wheels or other floor contacting elements is separable into two essentially linear primary components. The hub is defined by nesting hub elements each of which has a pair of oppositely extending arms. The separated components can be arranged to occupy a relatively small space thereby facilitating packaging, transporting and storage of the pedestal. Assembly can be easily accomplished by orienting one of the components at right angles to the other and then fitting the hub element of one into the hub element of the other.

6 Claims, 6 Drawing Figures

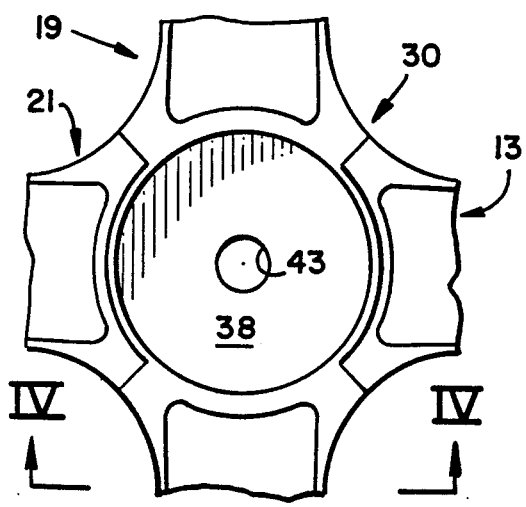
FIG_3
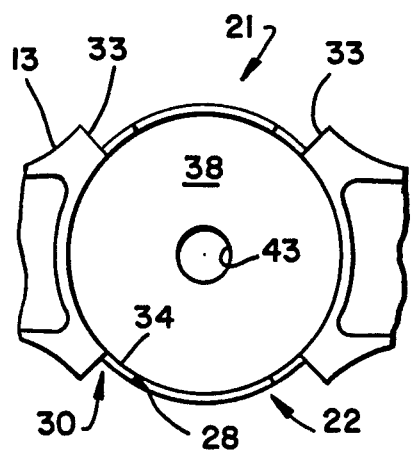
FIG_5
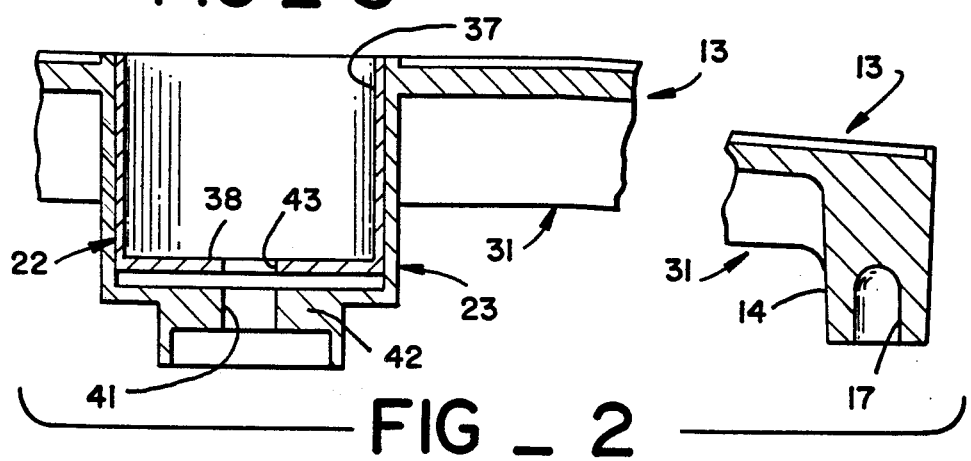
FIG_2
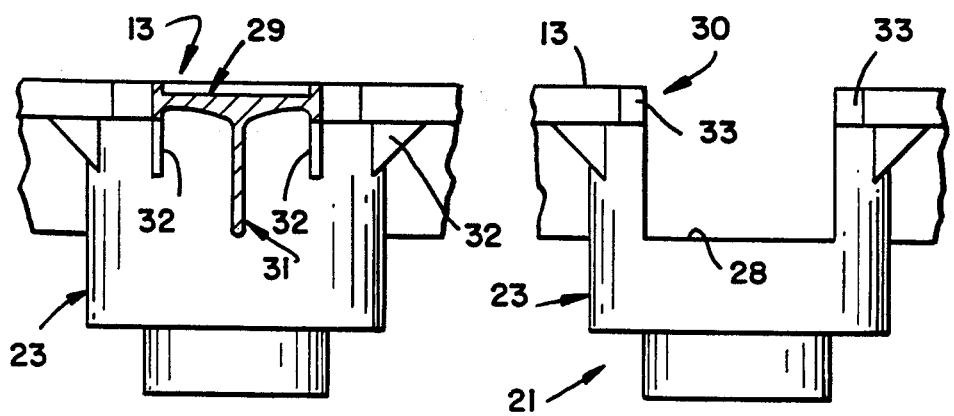
FIG_4　　　　　FIG_6

NESTED HUB KNOCK-DOWN PEDESTAL

TECHNICAL FIELD

This invention relates to base structure for supporting appliances, furniture or the like and more particularly to pedestals which have a plurality of arms that extend out from a central load supporting hub to caster wheels or other floor contacts.

BACKGROUND OF THE INVENTION

A common type of pedestal for supporting loads has a central hub and angularly spaced arms which extend out from the hub and connect with caster wheels or other floor contacting structure. A post extends upward from the hub to connect with the load which may variously be a stand for holding a television receiver or the like, a swivel chain or any of a variety of other objects.

The general configuration of pedestals of this kind results in sizable stress forces at the hub region of the structure. To assure adequate strength at that region, it has been the usual practice to form the hub and arms as permanently joined components. The hub and arms may be manufactured as a single unitary element or may be secured together by welding or by high strength adhesive and screws depending on the material used in the construction.

Such unitary or unitized constructions provide the necessary structural strength but also cause the pedestal to be very bulky and cumbersome to handle. This greatly complicates packaging, distribution and storage of the pedestals. The bulk, weight and irregular shape can also make it more difficult to move the assembly from one place to another.

A number of other products are often distributed to the consumer in a disassembled or partially disassembled state in order to alleviate problems of the kind discussed above. This is practical if the assembly process is simple and does not require specialized skills and/or specialized tools. Traditional pedestal constructions are not in that category. A knock down pedestal designed for assembly by consumers or other untrained persons should not require welding, forming of adhesive reinforced screw joints or other operations that require unusual equipment or which can result in a joint of inadequate strength if performed by person who lack specialized skills.

My copending U.S. patent application Ser. No. 791,088, filed Oct. 24, 1985, and entitled Compactible Pedestal, describes a pedestal construction which alleviates the problems discussed above. The arms and hub are initially separated elements which can be distributed and stored as a very compact package and which are easily assembled and interlocked to form a high strength unitized pedestal. A knock-down pedestal which has fewer, although larger, parts in the disassembled state and which involves an even simpler assembly process would also be advantageous.

The present invention is directed to overcoming one or more of the problems discussed above.

SUMMARY OF THE INVENTION

In one aspect of the present invention, a pedestal support has a central hub and a plurality of arms that extend outwardly from the hub at angular intervals around the hub. The hub has means for connection to a load that is to be supported by the pedestal and the arms have means for contacting a floor or other underlying surface. The hub is formed at least in part by first and second hub elements each having a pair of arms which extend outwardly from opposite locations on the hub element. The first hub element has a chamber into which the second hub element is fitable in nesting relationship with the first hub element. The first hub element also has a chamber wall with slots in which the pair of arms of the second hub element are received when the hub elements are in the nesting relationship.

In another more specific aspect, the invention provides a pedestal for supporting an overhead load which includes a first hub element having a central chamber which is open at the top and has slots at diametrically opposite locations on the chamber sidewall. A first pair of arms extend sidewardly from the first hub element at diametrically opposite locations which are situated between the locations of the slots on the first hub element. A second hub element is proportioned to fit into the chamber of the first hub element in nested relationship with the first hub element. A second pair of arms extend sidewardly from the second hub element at diametrically opposite locations and are proportioned to fit into the slots of the first hub element when the first and second hub elements are in the nested relationship.

The invention is distinct from prior pedestals in that the hub is defined by two separable nesting elements each of which has a pair of oppositely extending arms. Thus the assembly is dividable into two primary components each of which is essentially linear in shape. Consequently, the separated components can be arranged to occupy a relatively small amount of space thereby greatly facilitating packaging, transporting and storage of the pedestal. Assembly can be very easily accomplished by orienting the two components at right angles to each other and then fitting the hub element of one into the hub element of the other. The pedestal is structurally simple and can be economically manufactured while providing a very high strength construction.

BRIEF DESCRIPTION OF THE DRAWINGS

FIG. 2 is a foreshortened elevation section view of the hub region and one arm of the support pedestal of FIG. 1.

FIG. 3 is a top view of the hub region of the support pedestal of the preceding figures.

FIG. 4 is a cross section view taken along line IV—IV of FIG. 3.

FIG. 5 is a top view of the hub region of the lowermost of the separated pedestal components of FIG. 1.

FIG. 6 is a side view of the lowermost of the separated pedestal components of FIG. 1.

DETAILED DESCRIPTION OF THE PREFERRED EMBODIMENT

Figure 1:
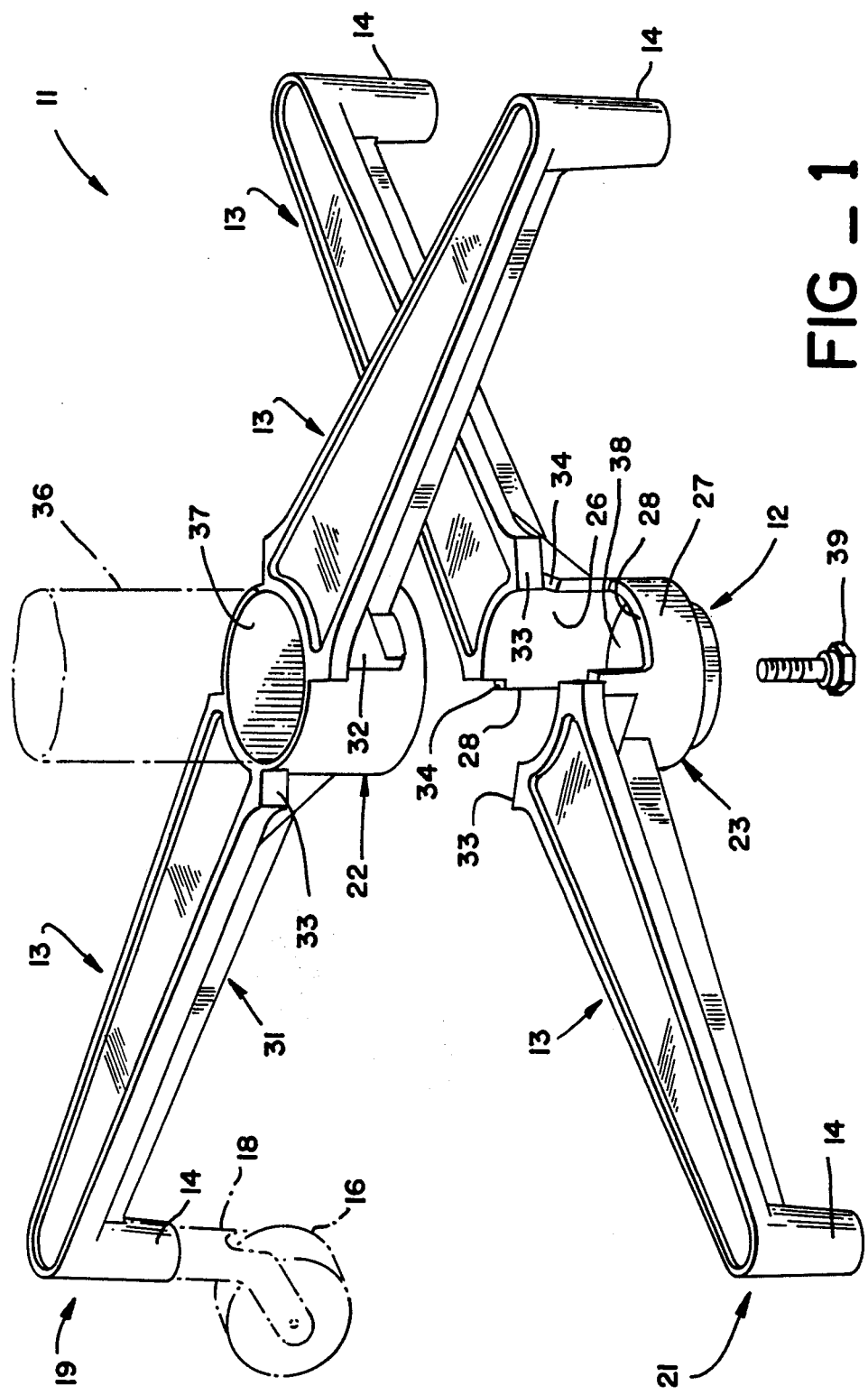
FIG. 1 is an exploded perspective view of the preferred embodiment of the support pedestal with certain primary components shown separated from each other.

Referring initially to FIG. 1 of the drawings, a pedestal support 11 in accordance with this example of the invention has a central load supporting hub 12 from which four arms 13 extend outwardly, the arms being angularly spaced at 90° intervals around the hub. A relatively short leg 14 extends downward from the end of each such arm 13. A caster wheel 16 is engagable on each leg 14 in this embodiment although caster wheels are not essential in all cases and other floor contacting structure may also be used. Referring now to FIG. 2 in conjunction with FIG. 1, each leg 14 of this example has an upwardly extending bore 17 for receiving the pivot shaft 18 of the caster wheel 16.

Referring again to FIG. 1 in particular, the pedestal 11 is defined primarily by two initially separate components 19 and 21. The first component 19 has an inner hub element 22 which is of essentially cylindrical configuration in this example. A pair of the arms 13 extend radially outward from the inner hub element 22 at diametrically opposite locations on the hub element.

The second component 21 of the pedestal 11 includes an outer hub element 23 which is also cylindrical in this example and the second pair of arms 13 extend radially outward from diametrically opposite locations on the outer hub element.

Referring again to FIGS. 1 and 2 in conjunction, the diameter of the inner hub element 22 is smaller than the diameter of the outer hub element 23 to enable the two hub elements to be fitted together in a nested coaxial relationship. The outer hub element 23 has an interior chamber 26 shaped to receive the inner hub element 22 and the chamber sidewall 27 is provided with a pair of broad notches 28 situated between the arms 13 of that hub element in position to receive the arms of the other pedestal component 19 when the hub elements 22 and 23 are fitted together.

Referring to FIGS. 2, 3 and 4 in combination, the specific configuration of the arms 13 may take other forms but it is advantageous from the standpoint of providing high strength with small bulk and weight to form each arm with a broad upper portion 29 and a relatively thin downwardly directed rib 31 along the center of the underside of the upper portion. Triangular reinforcements 32 extend between the hub elements 22, 23 and the upper portion 29 of the arms 13 at each side of the ribs 31 to further strengthen the junctions of the arms and hub elements.

The arms 13 and the associated hub element 22 or 23, including ribs 31 and reinforcements 32 may be formed as a single integral element or may be separately fabricated elements which are secured together by welding, screws and adhesive or other means depending on the material of which the components 19, 21 are made.

Referring to FIGS. 3, 5 and 6 in conjunction, means 30 are provided for interlocking pedestal components 19 and 21 in a right angled relationship when the hub elements 22 and 23 are nested together as described above. For this purpose, the ends of the arms 13 that are closest to the associated hub element 22 or 23 are formed with side surfaces 33 that are aligned with radii of the associated hub element and which subtend to 90° arc of the associated hub element. With reference to FIG. 3 in particular, when the pedestal components 19 and 21 are fitted together as previously described each side surface 33 abuts a similar side surface of another of the arms 13. This prevents rotational movement of either pedestal component 19 and 21 relative to the other about the vertical axis of the pedestal and also strengthens the structure with respect to resisting forces which tend to cause such relative movement.

Referring again to FIG. 1, the previously described slots 28 in the outer hub element 23 have a width which subtends less than a 90° arc of the hub element. Thus a small shelf 34, formed by the upper edge of hub element 23, is provided adjacent each arm side surface 33 of the pedestal component 21. When the support pedestal 11 is assembled as described above, the portions of the arms 13 of component 19 adjacent the side surfaces 33 of that component seat on the shelves 34 of the other component 21. This limits downward travel of inner hub element 22 within outer hub element 23 and maintains the four arms 13 in coplanar relationship.

Referring again to FIG. 1, the pedestal 11 may be used to support a diverse variety of structure and arrangements for coupling such load structure to the hub 12 may take a variety of forms. The support pedestal 11 may, for example, be a base for a stand on which a television set or other appliance is disposed or may function as the base of a chair. Many of the structures that may be supported by the pedestal 11 have a vertical shaft or post 36 at least at the bottom of the structure. In such cases, the interior chamber 37 of the inner hub element 22 may be proportioned to receive the bottom of the shaft or post 36. Referring again to FIG. 2, the inner hub element 22 may be provided with a floor 38 against which the supported structure rests if other means are not provided for the purpose.

Referring again to FIGS. 1 and 2 in combination, if the chamber 37 of inner hub element 22 has a shape conforming with that of the lower end of the shaft or post 36 gravity acts to retain the post and thus the supported load at hub 12. the weight of the load also acts to hold the components 19 and 21 of the support pedestal 11 in the assembled and interlocked state. Consequently, it may not be necessary in some instances to provide any further coupling of the post 36 to the pedestal 11 and/or any positive attachment of the pedestal components 19 and 21 to each other. Such an arrangement does not enable lifting of the load and pedestal 11 as a unit and therefore a positive attachment of the post 36 and pedestal components 19 and 21 is preferable in many instances. Such attachment may take other forms but in this example, a bolt 39 may be inserted into a central aperture 41 in the bottom wall 42 of outer hub element 23 and a similar aperture 43 in the floor 38 of the inner hub element 22 and be threaded into the base of the post 36. This simultaneously locks the pedestal components 19 and 21 together and secures the load to the pedestal 11.

Prior to actual use of the support pedestal 11, components 19 and 321 may be separated for greater convenience in packaging and/or shipping and/or distribution to the consumer. The unassembled construction has much less bulk and a more convenient shape if, for example, the components 19 and 21 are arranged in parallel side by side relationship. Assembly is very easily effected by orienting the two components 19 and 21 at right angles to each other and then fitting inner hub element 22 into outer hub element 23 in the manner hereinbefore described. Post 36 is then inserted into chamber 37 and bolt 39 is engaged to complete the assembly process.

The support pedestal 11 can easily be disassembled for storage or movement to another site simply by reversing the above described procedure and may then be reassembled when again needed.

The above described example of the support pedestal as depicted in the drawings is formed of metal with welded joints between the arms 13 and hub elements 22 and 23. The basic construction is also adaptable to pedestals formed of other materials such as plastics or wood, for example.

While the invention has been depicted with respect to a specific preferred embodiment, many variations are possible and it is not intended to limit the invention except as defined in the following claims.

I claim:

1. In a support pedestal having a central hub and a plurality of arms extending outwardly from said hub at angular intervals therearound, said hub having means for receiving a vertically extending member which connects with a load that is to be supported by the pedestal and said arms having means for contacting a floor or other underlying surface, wherein the improvement comprises:

said hub being formed at least in part by first and second hub elements each having a pair of said arms extending outwardly from the hub element at opposite locations thereon, the first hub element being of greater diameter than the second hub element and having a first chamber with an opening at the top into which the second hub element is fittable in seated nesting relationship with the first hub element, the first hub element having a chamber wall with a pair of oppositely situated slots therein which extend downward from said opening and which are located between the arms of said first hub element and in which said pair of arms of said second hub element are received when said hub elements are in said nesting relationship, said second hub element having means for receiving said vertically extending member and for bearing the weight thereof, wherein said arms of said second hub element have horizontally extending side portions located to seat against the upper end of said first hub element in the regions thereof which are adjacent the upper ends of said slots when said hub elements are in said nesting relationship.

2. In a support pedestal having a central hub and a plurality of arms extending outwardly from said hub at angular intervals therearound, said hub having means for receiving a vertically extending member which connects with a load that is to be supported and said arm having means for contacting a floor or other underlying surface, wherein the improvement comprises:

said hub being formed at least in part by first and second hub elements each having a pair of said arms extending outwardly from the hub element at opposite locations thereon, the first hub element being of greater diameter than the second hub element and having a first chamber with an opening at the top into which the second hub element is fittable in seated nesting relationship with the first hub element, the first hub element having a chamber wall with a pair of oppositely situated slots therein which extend downward from said opening and which are located between the arms of said first hub element and in which said pair of arms of said second hub element are received when said hub elements are in said nesting relationship, said second hub element having means for receiving said vertically extending member and for bearing the weight thereof, wherein said first and second hub elements are cylindrical and fit together in coaxial relationship when in said nested relationship, and wherein said arms each have an inner end adjacent said hub elements which is proportioned to subtend 90° of the circumference of said nested hub elements thereby resulting in abutment of the sides of said arms at the region adjacent said first hub element when said hub elements are in said nesting relationship.

3. In a support pedestal having a central hub and a plurality of arms extending outwardly from said hub at angular intervals therearound, said hub having means for receiving a load that is to be supported by the pedestal and said arms having means for contacting a floor or other underlying surface, wherein the improvement comprises:

said hub being formed at least in part by first and second hub elements each having a pair of said arms extending outwardly from the hub element at opposite locations thereon, the first hub element having a chamber into which the second hub element is fitable in nesting relationship with the first hub element, the first hub element having a chamber wall with slots therein in which said pair of arms of said second hub element are received when said hub elements are in said nesting relationship, wherein said first and second hub elements are cylindrical and fit together in coaxial relationship when in said nested relationship, and wherein said arms each have an inner end adjacent said hub elements which is proportioned to subtend 90° of the circumference of said nested hub elements and wherein each of said slots subtends less than 90° of the circumference of said nested hub elements thereby enabling seating of said inner ends of said arms of said second hub element against portions of the upper edge of said chamber wall of said first hub element.

4. In a support pedestal having a central hub and a plurality of arms extending outwardly from said hub at angular intervals therearound, said hub having means for receiving a load that is to be supported by the pedestal and said arms having means for contacting a floor or other underlying surface, wherein the improvement comprises:

said hub being formed at least in part by first and second hub elements each having a pair of said arms extending outwardly from the hub element at opposite locations thereon, the first hub element having a chamber into which the second hub element is fitable in nesting relationship with the first hub element, the first hub element having a chamber wall with slots therein in which said pair of arms of said second hub element are received when said hub elements are in said nesting relationship, wherein said second hub element has a chamber which is open at the top to receive a lower portion of structure which is to be supported by said pedestal, means for securing said lower portion of said structure to said pedestal within said chamber, and wherein each of said hub elements has a floor portion with a central aperture therein and wherein said means for securing said lower portion of said structure to said pedestal includes a bolt or the like extending upward through said apertures to said structure.

5. In a support pedestal having a central hub and a plurality of arms extending outwardly from said hub at angular intervals therearound, said hub having means for receiving a vertically extending member which connects with a load that is to be supported by the pedestal and said arms having means for contacting a floor or other underlying surface, wherein the improvement comprises:

said hub being formed at least in part by first and second hub elements each having a pair of said arms extending outwardly from the hub element at opposite locations thereon, the first hub element being of greater diameter than the second hub element and having a first chamber with an opening at the top into which the second hub element is fittable in seated nesting relationship with the first hub element, the first hub element having a chamber wall with a pair of oppositely situated slots therein which extend downward from said opening and which are located between the arms of said first hub element and in which said pair of arms of said second hub element are received when said hub elements are in said nesting relationship, said second hub element having means for receiving said vertically extending member and for bearing the weight thereof, wherein said first and second hub elements are nested together with said pair of arms of said first hub being oriented at right angles to said pair of arms of said second hub element, further including means for preventing turning of said second hub element relative to said first hub element by abutment of vertically oriented surfaces which extend outward from said hub elements and means for preventing downward movement of said second hub element relative to said first hub element by abutment of non-vertical surfaces of each thereof.

6. In a support pedestal having a central hub and a plurality of arms extending outwardly from said hub at angular intervals therearound, said hub having means for receiving a vertically extending member which connects with a load that is to be supported by the pedestal and said arms having means for contacting a floor or other underlying surface, wherein the improvement comprises:

said hub being formed at least in part by first and second hub elements each having a pair of said arms extending outwardly from the hub element at opposite locations thereon, the first hub element being of greater diameter than the second hub element and having a first chamber with an opening at the top into which the second hub element is fittable in seated nesting relationship with the first hub element, the first hub element having a chamber wall with a pair of oppositely situated slots therein which extend downward from said opening and which are located between the arms of said first hub element and in which said pair of arms of said second hub element are received when said hub elements are in said nesting relationship, said second hub element having means for receiving said vertically extending member and for bearing the weight thereof, wherein said first and second hub elements are nested together with said pair of arms of said first hub element being oriented at right angles to said pair of arms of said second hub element, further including means for preventing turning of said second hub element relative to said first hub element, wherein said means for preventing turning of said second hub element relative to said first hub element includes side surfaces of said arms of said first hub element abutting side surfaces of said arms of said second hub element in the region adjacent said hub elements, and means for preventing downward movement of said second hub element relative to said first hub element.

* * * * *